(12) United States Patent
Chiang

(10) Patent No.: US 11,904,968 B2
(45) Date of Patent: Feb. 20, 2024

(54) BICYCLE ACCESSORY MOUNTING BRACKET

(71) Applicant: TIEN HSIN INDUSTRIES CO., LTD., Taichung (TW)

(72) Inventor: Meng-Hua Chiang, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 245 days.

(21) Appl. No.: 17/551,213

(22) Filed: Dec. 15, 2021

(65) Prior Publication Data
US 2023/0182845 A1    Jun. 15, 2023

(51) Int. Cl.
*F16M 13/02* (2006.01)
*B62J 11/00* (2020.01)
*B62J 11/22* (2020.01)

(52) U.S. Cl.
CPC ............. *B62J 11/22* (2020.02); *B62J 11/00* (2013.01); *F16M 13/022* (2013.01); *F16M 2200/027* (2013.01)

(58) Field of Classification Search
CPC ... B62J 11/00; B62J 11/22; B62J 7/06; F16M 13/022; F16B 21/14; F16B 21/125
USPC .... 224/420, 443, 548; 403/108, 52, 83, 104, 403/164
See application file for complete search history.

(56) References Cited

U.S. PATENT DOCUMENTS

| | | | |
|---|---|---|---|
| 7,152,834 B2 * | 12/2006 | Hsu | F21V 21/30 248/230.1 |
| 2017/0137080 A1 * | 5/2017 | White | F16B 1/00 |
| 2023/0182845 A1 * | 6/2023 | Chiang | B62J 11/00 224/412 |

FOREIGN PATENT DOCUMENTS

WO    WO-2015129980 A1 *    9/2015    ............. B60R 11/02

* cited by examiner

*Primary Examiner* — Justin M Larson

(57) ABSTRACT

A bicycle accessory mounting bracket includes a first member, a second member and a plug member. The first member has a first connecting pillar with a first sliding slot. The second member has a second connecting pillar. The plug member is inserted into the first and second connecting pillars inserted into each other through the first sliding slot and the through hole of the second connecting pillar. The plug member includes a shell, an actuating member and two abutting members. The actuating member has a wide portion and a concave portion. In the first position, the wide portion is located between the penetration holes, and the abutting members are pushed by the wide portion to enter the perforation holes. When in the second position, the concave portion is located between the penetration holes, the abutting members enter the concave portion, and the first and second connecting pillars can rotate relatively.

10 Claims, 6 Drawing Sheets

BICYCLE ACCESSORY MOUNTING BRACKET

FIELD OF THE INVENTION

The present invention relates to a mounting bracket, and more particularly to a bicycle accessory mounting bracket.

BACKGROUND OF THE INVENTION

There are many bicycle accessories on the market, such as bicycle speedometers, bells, water bottles, etc., and these accessories have corresponding mounting brackets to install these accessories on the bicycle. However, most of the current bicycle accessory mounting brackets can only provide the function of fixing the accessories, so most of the accessories cannot fine adjust their positions after the accessories are installed. For example, the current bicycle speedometer mounting bracket can only fix the bicycle speedometer on the bicycle but cannot arbitrarily adjust the tilt angle of the display surface of the bicycle speedometer, which causes inconvenience in use.

SUMMARY OF THE INVENTION

The present invention provides a bicycle accessory mounting bracket capable of fine adjusting the position of the accessory.

The bicycle accessory mounting bracket provided by the present invention includes a first member, a second member and a plug member. The first member has a top surface and a side surface adjacent to each other. The side surface is provided with a first connecting pillar extending along a predetermined direction. The first connecting pillar has a first sliding slot extending along a predetermined path. The predetermined path partially surrounds the predetermined direction. The second member includes a second connecting pillar. The second connecting pillar and the first connecting pillar are inserted into each other, and the second connecting pillar has a through hole corresponding to the first sliding slot. The plug member is inserted into the first connecting pillar and the second connecting pillar through the first sliding slot and the through hole. The plug member includes a shell, an actuating member and two abutting members. The actuating member is inserted into the shell. The shell has two opposite penetration holes. The two abutting members are movably arranged between the two penetration holes and the actuating member, respectively. The actuating member has a wide portion and a concave portion connected to each other. The actuating member is adapted to move between a first position and a second position. When the actuating member is in the first position, the wide portion is located between the two penetration holes, and the two abutting members are pushed by the wide portion to enter the two perforation holes and abut against two inner surfaces of the first sliding slot, respectively. When the actuating member is in the second position, the concave portion is located between the two penetration holes, the two abutting members enter the concave portion from the two penetration holes respectively, and the first connecting pillar can rotate relative to the second connecting pillar.

In an embodiment of the present invention, the first connecting pillar is a hollow cylinder and further has a second sliding slot corresponding to the first sliding slot. The second connecting pillar is inserted into the first connecting pillar, and the through hole further corresponds to the second sliding slot. The plug member is inserted into the first connecting pillar and the second sliding slot through the second sliding slot, the first sliding slot and the through hole.

In an embodiment of the present invention, the plug member further includes a spring arranged in the shell and located between a bottom of the shell and the wide portion of the actuating member. The actuating member compresses the spring when the actuating member is pressed by an external force and moves toward the bottom of the shell to the second position. The spring pushes the actuating member to the first position when the external force is removed.

In an embodiment of the present invention, the side surface further has a convex wall. The first connecting pillar is arranged on the convex wall. The second member further has a side wall surrounding the second connecting pillar and corresponding to the convex wall. When the first connecting pillar and the second connecting pillar are inserted into each other, the side wall further surrounds the first connecting pillar, and the side wall has an opening aligned with the through hole. The plug member passes through the opening, the second sliding slot, the through hole and the first sliding slot, and a part of the actuating member extends out of the side wall through the opening.

In an embodiment of the present invention, the actuating member further includes a taper arranged between the concave portion and the wide portion, and a width of the taper gradually decreases from the wide portion toward the concave portion.

In an embodiment of the present invention, each of the two abutting members includes a round ball.

In an embodiment of the present invention, one of the first member and the second member includes an accessory fixing member, and the other of the first member and the second member includes a bicycle connector.

In an embodiment of the present invention, the bicycle connector further has a ring portion and a buckle portion. The second connecting pillar is connected to the ring portion. The ring portion has a gap, a first end and a second end, and the first end and the second end are located on opposite sides of the gap. The buckle portion has a body and a connecting member. The body has a buckle slot, an actuation end and a pivot end opposite to the actuation end. The buckle slot is located between the actuation end and the pivot end. The pivot end is pivotally connected to the first end. The connecting member has a third end and a fourth end opposite to each other. The third end is pivotally connected between the actuation end and the buckle slot. The fourth end is pivotally connected to the second end. The buckle slot is adapted to be buckled at a pivotal joint between the fourth end and the second end.

In an embodiment of the present invention, the bicycle connector further includes a non-slip portion arranged on an inner surface of the ring portion.

In an embodiment of the present invention, an outer surface of the ring portion has an accommodating groove corresponding to the buckle portion. The accommodating groove passes through the first end and the second end. The pivot end is pivotally connected in the accommodating groove. The fourth end is pivotally connected in the accommodating groove.

In the bicycle accessory mounting bracket of the present invention, the first connecting pillar of the first member (e.g., including the accessory fixing member) and the second connecting pillar of the second member (e.g., including the bicycle connector) can be connected to each other. Specifically, the first connecting pillar can rotate relative to the second connecting pillar, and therefore the first member can rotate relative to the bicycle connector. The plug member can lock the first connecting pillar and the second connecting pillar to each other. In this way, the user can rotate the first member and fix the first member with the plug member after the first member is rotated to a suitable angle. Based on the above, the bicycle accessory mounting bracket of the invention can provide the function of adjusting the accessory to a detailed position and further has the advantage of being easy to use.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
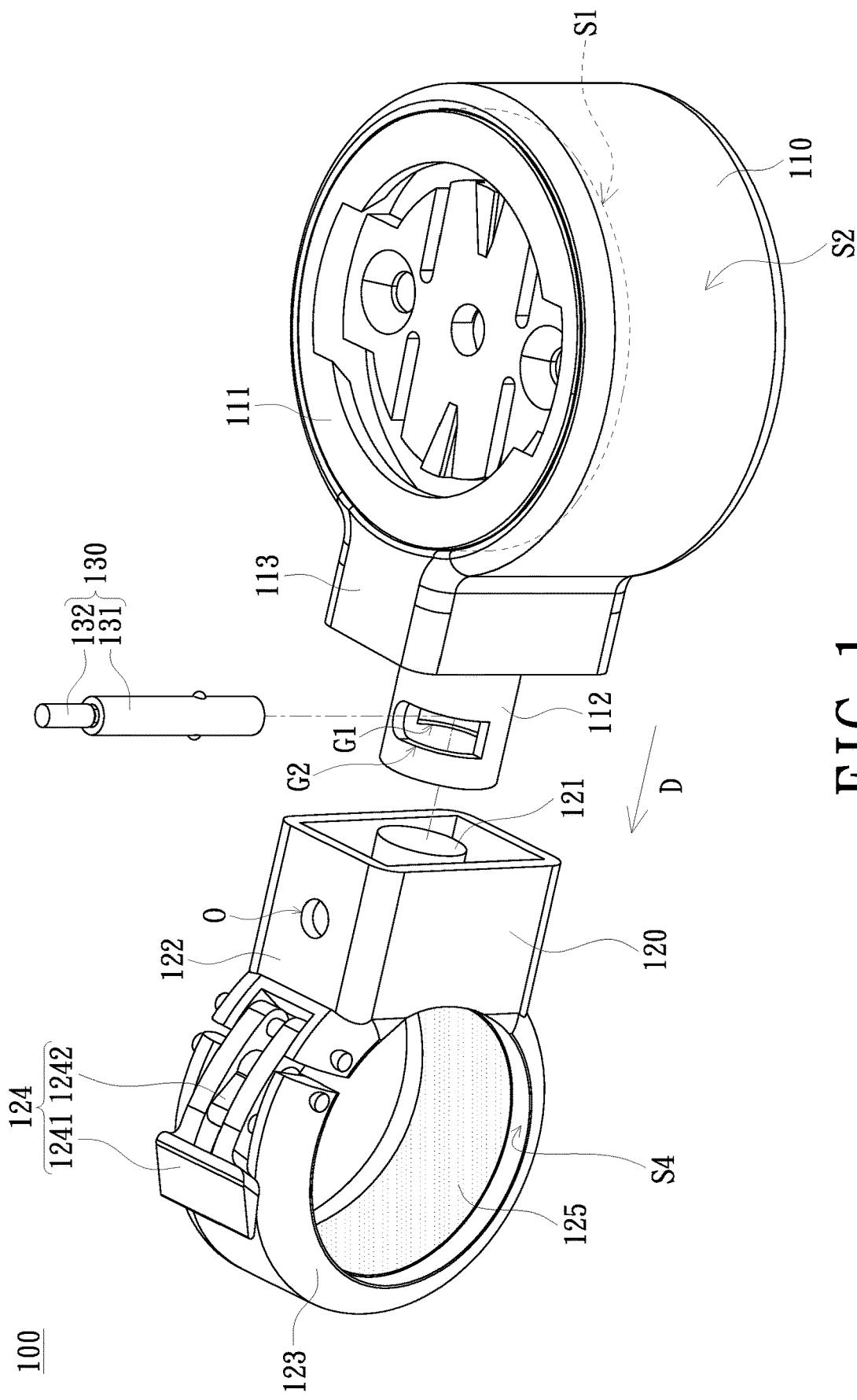
FIG. 1 is an exploded schematic view of a bicycle accessory mounting bracket according to an embodiment of the present invention.
Figure 2:
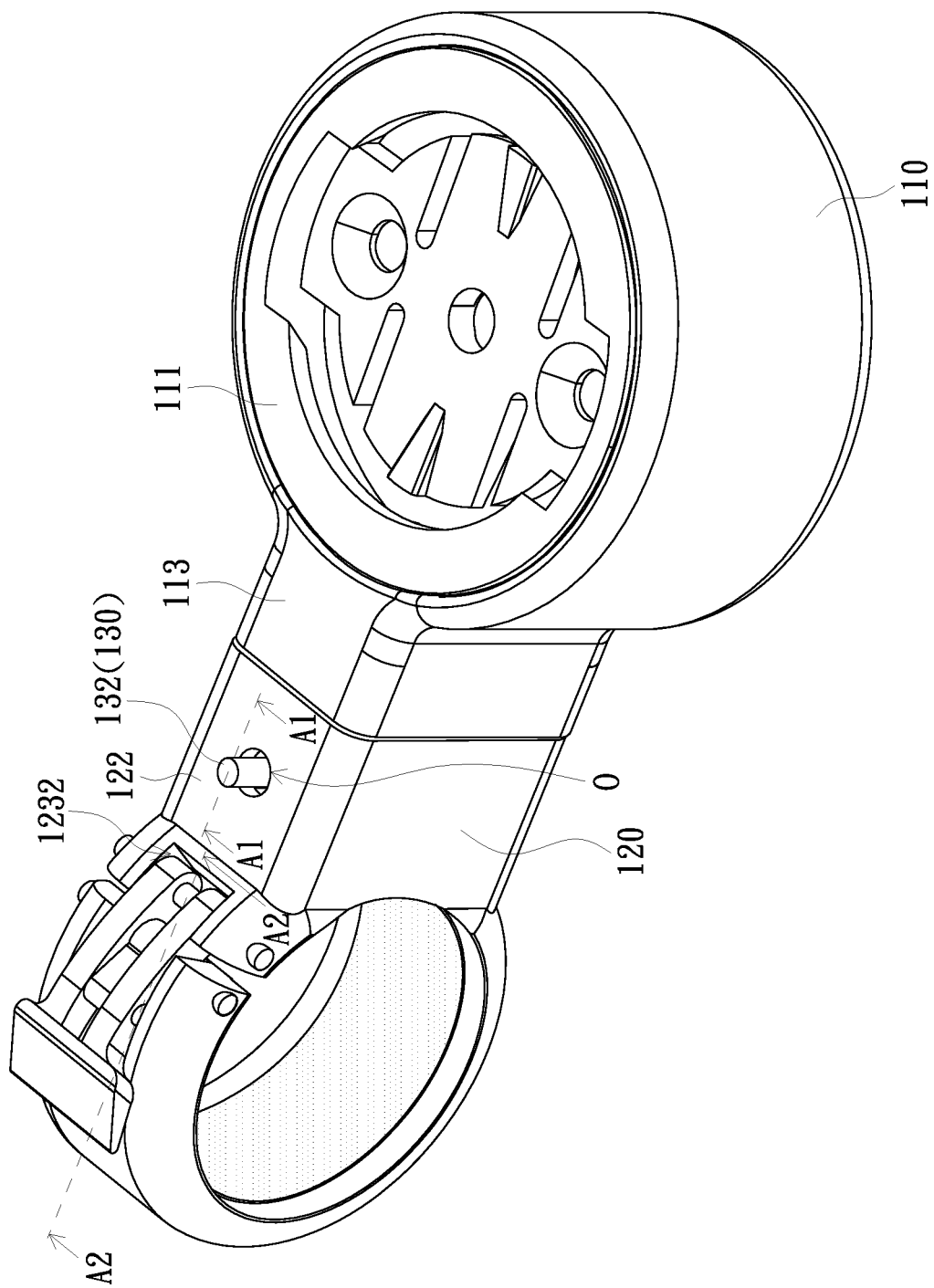
FIG. 2 is an assembly schematic view of the bicycle accessory mounting bracket of FIG. 1.

FIG. 1 is an exploded schematic view of a bicycle accessory mounting bracket according to an embodiment of the present invention. FIG. 2 is an assembly schematic view of the bicycle accessory mounting bracket of FIG. 1. Please referring to FIGS. 1 and 2, the bicycle accessory mounting bracket 100 includes a first member, a second member and a plug member 130. In this embodiment, the aforementioned first member includes, for example, an accessory fixing member 110, and the aforementioned second member includes, for example, a bicycle connector 120, but the present invention is not limited thereto. For example, in an embodiment, the aforementioned first member may include the bicycle connector 120, and the aforementioned second member may include the accessory fixing member 110. That is, the aforementioned first member may include one of the bicycle connector 120 and the accessory fixing member 110 and the aforementioned second member may include the other one of the bicycle connector 120 and the accessory fixing member 110 without affecting the desired effect of the present invention. In this embodiment, the accessory fixing member 110 can be used to fix a bicycle speedometer (not shown), but the present invention does not limit the specific use of the accessory fixing member 110. In this embodiment, the material of the accessory fixing member 110 may include metal, plastic, or carbon fiber composite material, and the material of the bicycle connector 120 is the same as the material of the accessory fixing member 110, but the present invention does not limit the specific materials. The assembly between the accessory fixing member 110, the bicycle connector 120 and the plug member 130 will be described below.

Figure 3:
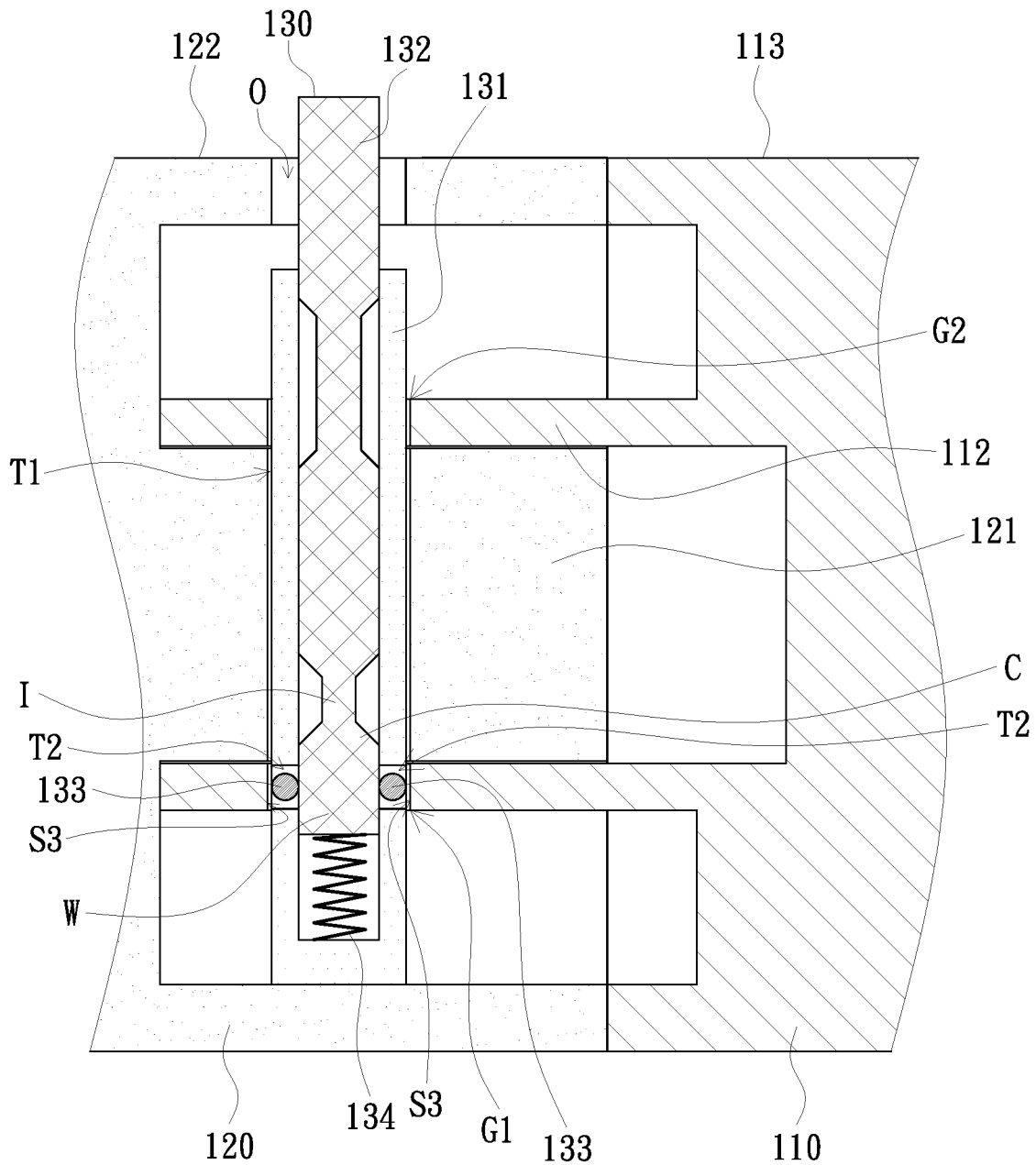
FIG. 3 is a schematic partial cross-sectional view of the bicycle accessory mounting bracket, taken along the line A1-A1 in FIG. 2, wherein an actuating member is in a first position.

FIG. 3 is a schematic partial cross-sectional view of the bicycle accessory mounting bracket, taken along the line A1-A1 in FIG. 2. Please referring to FIGS. 1 and 3, the accessory fixing member 110 has a top surface S1 and a side surface S2 adjacent to each other. The top surface S1 may be provided with an accessory fixing structure 111. The side surface S2 may be provided with a first connecting pillar 112 extending along a predetermined direction D. The first connecting pillar 112 has a first sliding slot G1 extending along a predetermined path. The aforementioned predetermined path partially surrounds the predetermined direction D. The bicycle connector 120 has a second connecting pillar 121. The second connecting pillar 121 and the first connecting pillar 112 are inserted into each other, and the second connecting pillar 121 has a through hole T1 corresponding to the first sliding slot G1. The plug member 130 is inserted into the first connecting pillar 112 and the second connecting pillar 121 via the first sliding slot G1 and the through hole T1.

Figure 4:
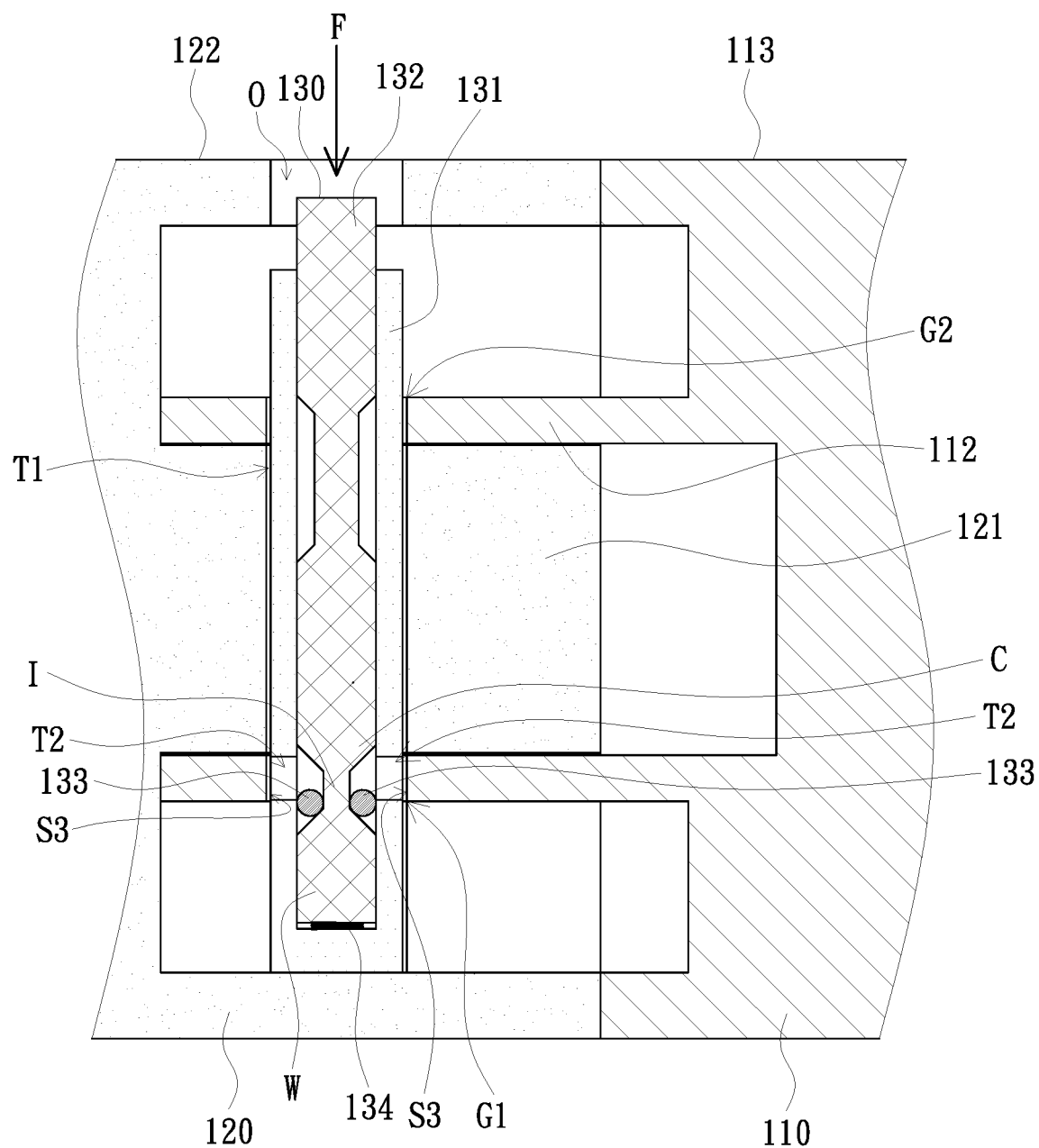
FIG. 4 is a schematic view of the bicycle accessory mounting bracket in FIG. 3, wherein the actuating member is in a second position.

The plug member 130 includes a shell 131, an actuating member 132 and two abutting members 133. The actuating member 132 is arranged to insert into the shell 131. The shell 131 has two opposite penetration holes T2. The two abutting members 133 are movably arranged between the two penetration holes T2 and the actuating member 132, respectively. The actuating member 132 has a wide portion W and a concave portion I connected to each other. The actuating member 132 is adapted to move between a first position and a second position. When the actuating member 132 is in the second position as shown in FIG. 4, the concave portion I is located between the two penetration holes T2, the two abutting members 133 respectively enter the concave portion I from the two penetration holes T2, and the first connecting pillar 112 can rotate relative to the second connecting pillar 121, so that the accessory fixing member 110 and the bicycle connector 120 can rotate relatively. When the actuating member 132 is in the first position as shown in FIG. 3, the wide portion W is located between the two penetration holes T2, and the two abutting members 133 are respectively pushed by the wide portion W to enter the two penetration holes T2 and abut against the two inner surfaces S3 of the first sliding slot G1.

Please refer to FIGS. 3 and 4 together. In detail, the user can move the actuating member 132 between the first position and the second position. When the actuating member 132 is in the first position, the two abutting members 133 respectively abut against the two inner surfaces S3 of the first sliding slot G1 to fix the accessory fixing member 110 and the bicycle connector 120 to each other without relative rotation, so that the orientation direction of the accessory fixing structure 111 (shown in FIG. 2) can be fixed. On the other hand, when the actuating member 132 is in the second position, the accessory fixing member 110 can rotate relative to the bicycle connector 120, so as to change the orientation direction of the accessory fixing structure 111. For example, when the accessory fixing structure 111 of this embodiment is used to fix a bicycle speedometer, the orientation direction of the display surface of the bicycle speedometer can be changed by rotating the accessory fixing member 110 with the first connecting pillar 112 as an axis when the actuating member 132 is in the second position, so that the user can view the display surface with a better viewing angle; and after the orientation direction of the display surface of the bicycle speedometer is adjusted, the user can move the actuating member 132 from the second position to the first position to fix the orientation direction of the display surface of the bicycle speedometer.

Please refer to FIGS. 1 and 4 together. Furthermore, the two inner surfaces S3 of the first sliding slot G1 are not respectively abutted by the two abutting members 133 when the actuating member 132 is in the second position, therefore, the two inner surfaces S3 of the first sliding slot G1 will move relative to the plug member 130 during the process of the accessory fixing member 110 rotating relative to the bicycle connector 120. In this embodiment, the inner surface S3 is, for example, a flat surface, so that the two inner surfaces S3 can move smoothly relative to the plug member 130, thereby enabling the accessory fixing member 110 to rotate relative to the bicycle connector 120 in a stepless manner. However, in an embodiment, the two inner surfaces S3 may be provided with a plurality of limiting protrusions (not shown) arranged along the aforementioned predetermined path, so that the accessory fixing member 110 can rotate relative to the bicycle connector 120 in a step manner. In another embodiment, the two inner surfaces S3 may be provided with a non-slip structure (not shown), so that the accessory fixing member 110 and the bicycle connector 120 can be more firmly fixed to each other when the plug member 130 is in the first position. The aforementioned non-slip structure may include particles provided on the two inner surfaces S3, or the two inner surfaces S3 can be formed as a rough surface to form the aforementioned non-slip structure, and the present invention is not limited thereto.

In this embodiment, the first connecting pillar 112 is, for example, a hollow cylinder and may further have a second sliding slot G2 corresponding to the first sliding slot G1. The through hole T1 further corresponds to the second sliding slot G2 when the second connecting pillar 121 is inserted into the first connecting pillar 112. That is, the plug member 130 is inserted into the first connecting pillar 112 and the second connecting pillar 121 via the second sliding slot G2, the first sliding slot G1 and the through hole T1. Specifically, when the accessory fixing member 110, the bicycle connector 120 and the plug member 130 are assembled together as shown in FIG. 3, the second sliding slot G2, the first sliding slot G1 and the through hole T1 are aligned with each other for the plug member 130 is inserted. In this embodiment, the second connecting pillar 121 is, for example, a solid cylinder with a shape complementary to the shape of the first connecting pillar 112, but the present invention does not limit the specific structure of the second connecting pillar 121. In addition, in an embodiment, the first connecting pillar 112 may be a solid cylinder, the first sliding slot G1 and the second sliding slot G2 may be arranged as through grooves penetrating the aforementioned solid cylinder, the second connecting pillar 121 may be, for example, a hollow cylinder having a shape complementary to the shape of the aforementioned solid cylinder, and the number of through holes T1 can be set to two and the two through holes T1 are arranged opposite to each other. The present invention does not limit the detailed features of the first connecting pillar 112 and the second connecting pillar 121.

The detailed structure of the plug member 130 will be described below to further understand the operation mode of the plug member 130. Please referring to FIGS. 3 and 4, the plug member 130 may further include a spring 134. The spring 134 is provided in the shell 131 and located between the bottom of the shell 131 and the wide portion W of the actuating member 132. The actuating member 132 compresses the spring 134 when the actuating member 132 is pressed by the external force F and moves toward the bottom of the shell 131 to the second position (FIG. 4); at this time, the two abutting members 133 are located in the concave portion I, so the first connecting pillar 112 can rotate relative to the second connecting pillar 121. Conversely, the spring 134 pushes the actuating member 132 to the first position (FIG. 3) when the external force F is removed from the actuating member 132; at this time, the two abutting members 133 abut between the wide portion W and the inner surface S3, so the first connecting pillar 112 and the second connecting pillar 121 are fixed to each other. In addition, the actuating member 132 may further include a taper C. The taper C is provided between the concave portion I and the wide portion W, and the width of the taper C gradually decreases from the wide portion W toward the concave portion I. Thus, the taper C can push the abutting members 133 to move from the concave portion I to the penetration holes T2 when the plug member 130 moves from the first position to the second position. Furthermore, the abutting member 133 includes, for example, a round ball, so that the abutting member 133 is easier to move between the concave portion I and the penetration hole T2.

Please referring to FIGS. 1 and 3 again, the side surface S2 of the accessory fixing member 110 further has, for example, a convex wall 113 (also shown in FIG. 2). The first connecting pillar 112 is provided on the convex wall 113. The bicycle connector 120 may further have a side wall 122 surrounding the second connecting pillar 121 and corresponding to the convex wall 113. The side wall 122 further surrounds the first connecting pillar 112 when the first connecting pillar 112 and the second connecting pillar 121 are inserted into each other. The side wall 122 has an opening O aligned with the through hole T1. The plug member 130 can pass through the opening O, the second sliding slot G2, the through hole T1 and the first sliding slot G1, and a part of the actuating member 132 extends out of the side wall 122 through the opening O. Furthermore, as shown in FIG. 3, the convex wall 113 and the side wall 122 surround the first connection pillar 112 and the second connection pillar 121 inserted into each other, thereby providing the function of protecting the first connection pillar 112 and the second connection pillar 121. Incidentally, in this embodiment as shown in FIGS. 1 and 2, the contour of the surface where the convex wall 113 and the side wall 122 connect each other is similar to, for example, a rectangle, so as to facilitate the alignment of the convex wall 113 and the side wall 122 when assembling the accessory fixing member 110 and the bicycle connector 120. However, in other embodiments, the specific structures of the convex wall 113 and the side wall 122 are not limited to those shown in the figure.

Figure 5:
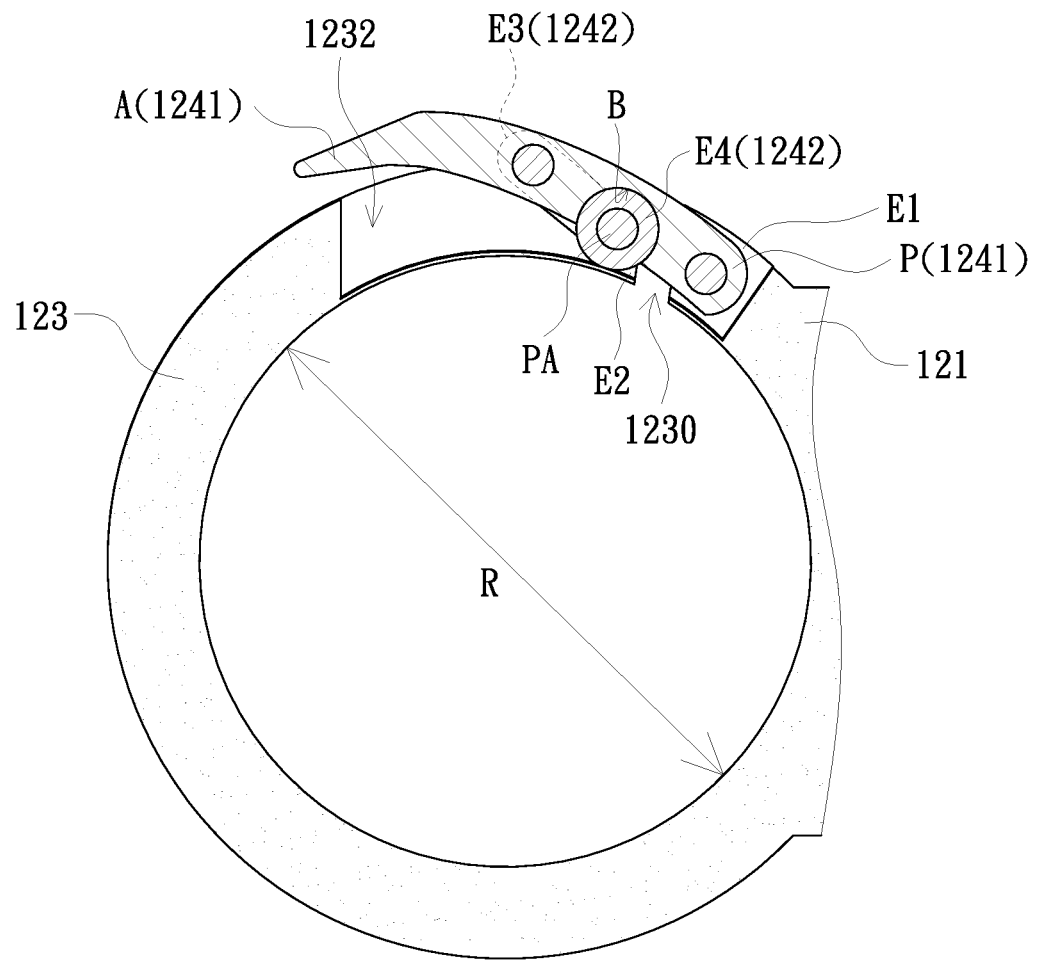
FIG. 5 is a schematic partial cross-sectional view of the assembled bicycle accessory mounting bracket, taken along the line A2-A2 in FIG. 2, wherein a buckle portion is moved close to a ring portion.
Figure 6:
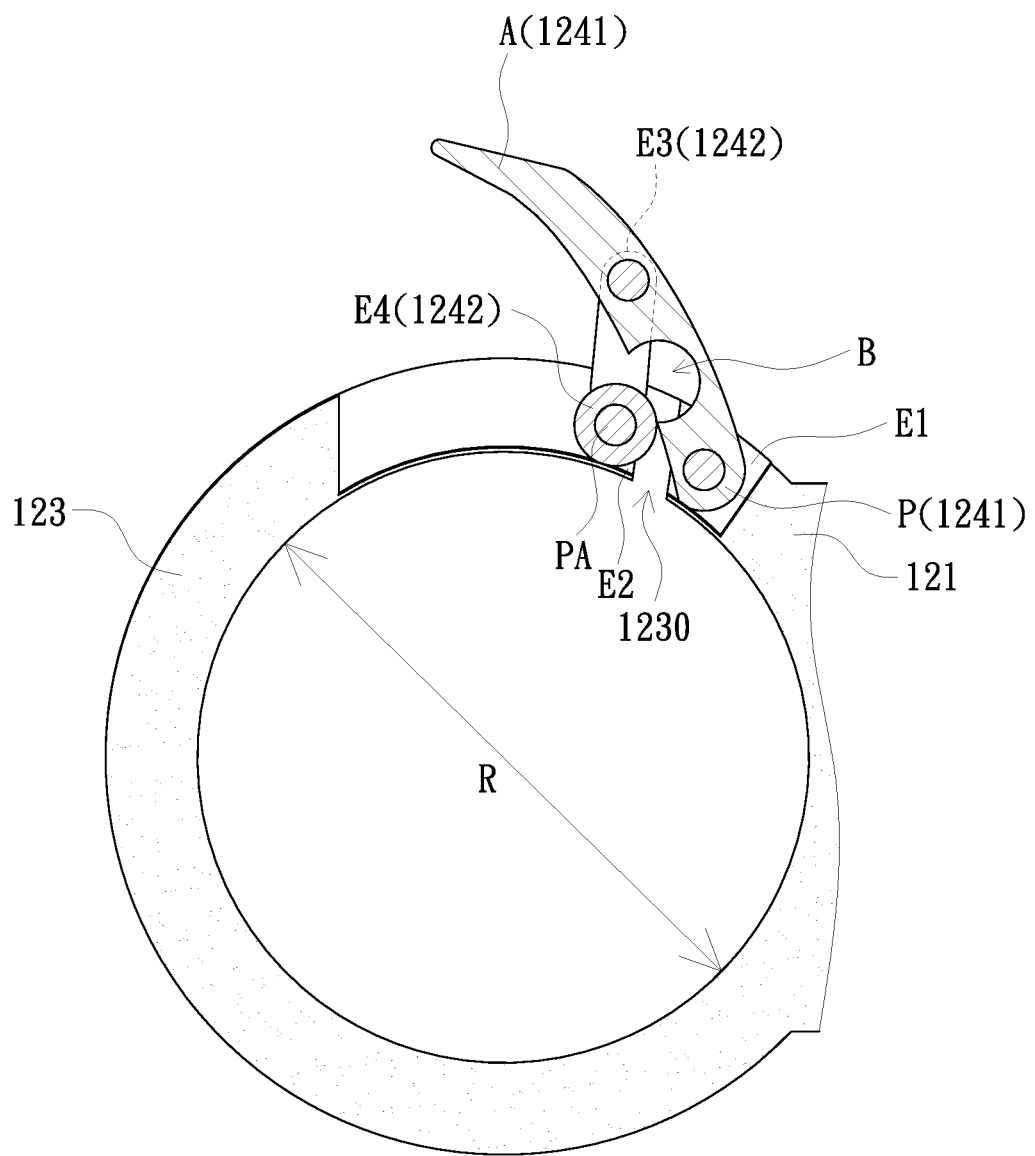
FIG. 6 is a schematic partial cross-sectional view of the assembled bicycle accessory mounting bracket, taken along the line A2-A2 in FIG. 2, wherein the buckle portion is moved away from the ring portion.

FIG. 5 is a schematic partial cross-sectional view of the assembled bicycle accessory mounting bracket, taken along the line A2-A2 in FIG. 2, wherein a buckle portion is moved close to a ring portion. FIG. 6 is a schematic partial cross-sectional view of the assembled bicycle accessory mounting bracket, taken along the line A2-A2 in FIG. 2, wherein the buckle portion is moved away from the ring portion. The related structure of connecting the bicycle connector 120 to the bicycle will be described below. Please refer to FIGS. 1 and 5 first. In this embodiment, the bicycle connector 120 may further include a ring portion 123 and a buckle portion 124 (shown in FIG. 1). The second connecting pillar 121 is connected to the ring portion 123. Specifically, the ring portion 123 can clamp, for example, the extension handle of the bicycle, and the buckle portion 124 can fix the ring portion 123 to the aforementioned extension handle, but the present invention does not limit the specific installation position of the bicycle connector 120. In this embodiment, the bicycle connector 120 further includes, for example, a non-slip portion 125 (shown in FIG. 1). The non-slip portion 125 is provided on the inner surface S4 of the ring portion 123 to increase the friction between the ring portion 123 and the aforementioned extension handle, so that the bicycle connector 120 can be more firmly installed on the bicycle. The material of the non-slip portion 125 includes, for example, silicone or rubber, but is not limited thereto. In addition, the non-slip portion 125 of this embodiment is continuously distributed on the inner surface S4 of the ring portion 123. However, in an embodiment, the non-slip portion 125 may be distributed on the inner surface S4 of the ring portion 123 in sections. The present invention does not limit the specific configuration of the non-slip portion 125.

Please referring to FIGS. 5 and 6, the ring portion 123 has, for example, a gap 1230, a first end E1 and a second end E2. The first end E1 and the second end E2 are respectively located on opposite sides of the gap 1230. The buckle portion 124 has a body 1241 and a connecting member 1242 (both shown in FIG. 1). The body 1241 has a buckle slot B, an actuation end A and a pivot end P. The actuation end A and the pivot end P are arranged opposite to each other, and the buckle slot B is located between the actuation end A and the pivot end P. The pivot end P is pivotally connected to the first end E1. Specifically, the actuation end A can be used to apply force to rotate the body 1241 relative to the pivot end P, and the body 1241 also drives the connecting member 1242 (also shown in FIG. 1) to rotate during the rotation of the body 1241. The connecting member 1242 has a third end E3 and a fourth end E4 opposite to each other. The third end E3 is pivotally connected between the actuation end A and the buckle slot B, and the fourth end E4 is pivotally connected to the second end E2. In this way, the third end E3 of the connecting member 1242 will rotate relative to the fourth end E4 when the third end E3 is driven by the body 1241. The buckle slot B is adapted to buckle at the pivotal joint between the fourth end E4 and the second end E2. In detail, the fourth end E4 may include a pivot shaft PA, and the second end E2 is pivotally connected to the pivot shaft PA. When the body 1241 and the connecting member 1242 move from the position as shown in FIG. 6 to the position as shown in FIG. 5, the inner diameter R of the ring portion 123 is gradually reduced to clamp the aforementioned extension handle, and the pivot shaft PA gradually moves toward the buckle slot B. When the pivot shaft PA is buckled in the buckle slot B as shown in FIG. 5, the body 1241 and the connecting member 1242 are fixed to each other, so that the ring portion 123 can be fixed to the aforementioned extension handle, and therefore the bicycle connector 120 is installed on the bicycle. Similarly, to detach the bicycle connector 120 from the aforementioned extension handle, the actuation end A is moved in a direction away from the ring portion 123 until the pivot shaft PA disengages from the buckle slot B, as shown in FIG. 6. In this way, the body 1241 and the connecting member 1242 are detached from each other. In addition, the inner diameter R of the ring portion 123 is slightly greater than that in the state as shown in FIG. 5, so that the bicycle connector 120 can be detached from the aforementioned extension handle.

Please refer to FIGS. 5 and 6 together again. The outer surface of the ring portion 123 may have an accommodating groove 1232 (also shown in FIG. 2) corresponding to the buckle portion 124. The accommodating groove 1232 passes through the first end E1 and the second end E2. The pivot end P is pivotally connected in the accommodating groove 1232, and the fourth end E4 is pivotally connected in the accommodating groove 1232. In detail, the accommodating groove 1232 can accommodate a part of the body 1241 when the body 1241 moves to the position as shown in FIG. 5, so the body 1241 can be closer to the ring portion 123, and therefore the ring portion 123 can more firmly clamp the aforementioned extension handle.

In summary, in the bicycle accessory mounting bracket of the present invention, the first connecting pillar of the first member (e.g., including the accessory fixing member) and the second connecting pillar of the second member (e.g., including the bicycle connector) can be connected to each other. Specifically, the first connecting pillar can rotate relative to the second connecting pillar, and therefore the first member can rotate relative to the bicycle connector. The plug member can lock the first connecting pillar and the second connecting pillar to each other. In this way, the user can rotate the first member and fix the first member with the plug member after the first member is rotated to a suitable angle. Based on the above, the bicycle accessory mounting bracket of the invention can provide the function of adjusting the accessory to a detailed position and further has the advantage of being easy to use.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bicycle accessory mounting bracket, comprising:
a first member, having a top surface and a side surface adjacent to each other, wherein the side surface is provided with a first connecting pillar extending along a predetermined direction, the first connecting pillar has a first sliding slot extending along a predetermined path, and the predetermined path partially surrounds the predetermined direction;
a second member, comprising a second connecting pillar, wherein the second connecting pillar and the first connecting pillar are inserted into each other, and the second connecting pillar has a through hole corresponding to the first sliding slot; and
a plug member, inserted into the first connecting pillar and the second connecting pillar through the first sliding slot and the through hole, wherein the plug member comprises a shell, an actuating member and two abutting members, the actuating member is inserted into the shell, the shell has two opposite penetration holes, the two abutting members are movably arranged between the two penetration holes and the actuating member respectively, the actuating member has a wide portion and a concave portion connected to each other, the actuating member is adapted to move between a first position and a second position, wherein when the actuating member is in the first position, the wide portion is located between the two penetration holes, and the two abutting members are pushed by the wide portion to enter the two penetration holes and abut against two inner surfaces of the first sliding slot respectively, wherein when the actuating member is in the second position, the concave portion is located between the two penetration holes, the two abutting members enter the concave portion from the two penetration holes respectively, and the first connecting pillar can rotate relative to the second connecting pillar.

2. The bicycle accessory mounting bracket according to claim 1, wherein the first connecting pillar is a hollow cylinder and further has a second sliding slot corresponding to the first sliding slot, the second connecting pillar is inserted into the first connecting pillar, the through hole further corresponds to the second sliding slot, the plug member is inserted into the first connecting pillar and the second sliding slot through the second sliding slot, the first sliding slot and the through hole.

3. The bicycle accessory mounting bracket according to claim 2, wherein the plug member further comprises a spring arranged in the shell and located between a bottom of the shell and the wide portion of the actuating member, the actuating member compresses the spring when the actuating member is pressed by an external force and moves toward the bottom of the shell to the second position, and the spring pushes the actuating member to the first position when the external force is removed.

4. The bicycle accessory mounting bracket according to claim 2, wherein the side surface further has a convex wall, the first connecting pillar is arranged on the convex wall, the second member further has a side wall surrounding the second connecting pillar and corresponding to the convex wall, wherein when the first connecting pillar and the second connecting pillar are inserted into each other, the side wall further surrounds the first connecting pillar, the side wall has an opening aligned with the through hole, the plug member passes through the opening, the second sliding slot, the through hole and the first sliding slot, and a part of the actuating member extends out of the side wall through the opening.

5. The bicycle accessory mounting bracket according to claim 1, wherein the actuating member further comprises a taper arranged between the concave portion and the wide portion, and a width of the taper gradually decreases from the wide portion toward the concave portion.

6. The bicycle accessory mounting bracket according to claim 5, wherein each of the two abutting members comprises a round ball.

7. The bicycle accessory mounting bracket according to claim 1, wherein one of the first member and the second member comprises an accessory fixing member, and the other of the first member and the second member comprises a bicycle connector.

8. The bicycle accessory mounting bracket according to claim 7, wherein the bicycle connector further has a ring portion and a buckle portion, the second connecting pillar is connected to the ring portion, the ring portion has a gap, a first end and a second end, the first end and the second end are located on opposite sides of the gap, the buckle portion has a body and a connecting member, the body has a buckle slot, an actuation end and a pivot end opposite to the actuation end, the buckle slot is located between the actuation end and the pivot end, the pivot end is pivotally connected to the first end, the connecting member has a third end and a fourth end opposite to each other, the third end is pivotally connected between the actuation end and the buckle slot, the fourth end is pivotally connected to the second end, and the buckle slot is adapted to be buckled at a pivotal joint between the fourth end and the second end.

9. The bicycle accessory mounting bracket according to claim 8, wherein the bicycle connector further comprises a non-slip portion arranged on an inner surface of the ring portion.

10. The bicycle accessory mounting bracket according to claim 8, wherein an outer surface of the ring portion has an accommodating groove corresponding to the buckle portion, the accommodating groove passes through the first end and the second end, the pivot end is pivotally connected in the accommodating groove, and the fourth end is pivotally connected in the accommodating groove.

* * * * *